US009301319B2

(12) United States Patent
Barriac et al.

(10) Patent No.: US 9,301,319 B2
(45) Date of Patent: Mar. 29, 2016

(54) SYSTEMS AND METHODS FOR MODIFYING CARRIER SENSE MULTIPLE ACCESS (CSMA) FOR DENSE NETWORKS

(71) Applicant: QUALCOMM Incorporated, San Diego, CA (US)

(72) Inventors: Gwendolyn Denise Barriac, Encinitas, CA (US); Vincent Knowles Jones, IV, Redwood City, CA (US); Hemanth Sampath, San Diego, CA (US); Santosh Paul Abraham, San Diego, CA (US); Rahul Tandra, San Diego, CA (US); Yan Zhou, San Diego, CA (US); Simone Merlin, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 14/152,861

(22) Filed: Jan. 10, 2014

(65) Prior Publication Data

US 2014/0198642 A1    Jul. 17, 2014

Related U.S. Application Data

(60) Provisional application No. 61/758,084, filed on Jan. 29, 2013, provisional application No. 61/752,412, filed on Jan. 14, 2013.

(51) Int. Cl.
*H04L 12/26* (2006.01)
*H04W 74/08* (2009.01)
*H04W 28/02* (2009.01)

(52) U.S. Cl.
CPC ...... *H04W 74/0808* (2013.01); *H04W 28/0289* (2013.01); *H04W 74/08* (2013.01)

(58) Field of Classification Search
None
See application file for complete search history.

(56) References Cited

U.S. PATENT DOCUMENTS

| 2006/0187840 | A1* | 8/2006 | Cuffaro et al. ............... 370/235 |
| 2011/0032864 | A1* | 2/2011 | Lee et al. ..................... 370/315 |
| 2011/0044298 | A1  | 2/2011 | Wentink et al. |
| 2011/0044303 | A1  | 2/2011 | Ji et al. |
| 2013/0070605 | A1  | 3/2013 | Ghosh et al. |
| 2013/0188653 | A1  | 7/2013 | Kim et al. |

FOREIGN PATENT DOCUMENTS

| EP | 1215851 A2 | 6/2002 |
| WO | WO-2006083565 A2 | 8/2006 |

OTHER PUBLICATIONS

International Search Report and Written Opinion—PCT/US2014/011315—ISA/EPO Apr. 9, 2014.

* cited by examiner

*Primary Examiner* — Afshawn Towfighi
(74) *Attorney, Agent, or Firm* — Knobbe Martens Olson & Bear LLP

(57) ABSTRACT

In one aspect, a method of communicating via a wireless medium by a wireless communications apparatus within a network is provided. The method includes detecting an operating characteristic associated with a load of the network. The method further includes determining a process for adjusting a size of a contention window in response to a successful transmission of a frame based on the detected operating characteristic, the contention window being provided for determining a deferral period for deferring access to the wireless medium. The method further includes transmitting information indicating the process to one or more wireless devices operating within the network.

23 Claims, 10 Drawing Sheets

SYSTEMS AND METHODS FOR MODIFYING CARRIER SENSE MULTIPLE ACCESS (CSMA) FOR DENSE NETWORKS

CLAIM OF PRIORITY UNDER 35 U.S.C. §119

The present application for patent claims priority to Provisional Application No. 61/752,412 entitled "SYSTEMS AND METHODS FOR MODIFYING CARRIER SENSE MULTIPLE ACCESS (CSMA) FOR DENSE NETWORKS" filed Jan. 14, 2013, and assigned to the assignee hereof and hereby expressly incorporated by reference herein. The present application for patent further claims priority to Provisional Application No. 61/758,084 entitled "SYSTEMS AND METHODS FOR MODIFYING CARRIER SENSE MULTIPLE ACCESS (CSMA) FOR DENSE NETWORKS" filed Jan. 29, 2013, and assigned to the assignee hereof and hereby expressly incorporated by reference herein.

BACKGROUND

1. Field

The present application relates generally to wireless communications, and more specifically to systems, methods, and devices for modifying carrier sense multiple access (CSMA) for dense networks.

2. Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

When there are multiple users of a wireless network, to avoid collisions and loss of data, the network may provide a procedure for coordinating access to the wireless medium. As the number of users of the wireless network rises, the chance of collisions even with coordination may further rise. Improved methods and systems for reducing loss of data in a network with a large number of users are desirable.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will appreciate how the features of this invention provide advantages that include providing wireless communication in sub-gigahertz bands for low power and long distance wireless communications.

One aspect of the subject matter described in the disclosure provides a method of communicating via a wireless medium by a wireless communications apparatus within a network. The method includes detecting an operating characteristic associated with a load of the network. The method further includes determining an process for adjusting a size of a contention window in response to a successful transmission of a frame based on the detected operating characteristic. The contention window is provided for determining a deferral period for deferring access to the wireless medium. The method further includes transmitting information indicating the process to one or more wireless devices operating within the network.

Another aspect of the subject matter described in the disclosure provides a wireless communications apparatus for communicating via a wireless medium within a network. The apparatus includes a processor configured to detect an operating characteristic associated with a load of the network and to determine an process for adjusting a size of a contention window in response to a successful transmission of a frame based on the detected operating characteristic, the contention window being provided for determining a deferral period for deferring access to the wireless medium. The apparatus also includes a transmitter configured to transmit information indicating the process to one or more wireless devices operating within the network.

Another aspect of the subject matter described in the disclosure provides a computer program product comprising a computer readable medium encoded thereon with instructions that when executed cause a wireless communications apparatus to perform method of communicating via a wireless medium within a network. The method includes detecting an operating characteristic associated with a load of the network, determining an process for adjusting a size of a contention window in response to a successful transmission of a frame based on the detected operating characteristic, the contention window being provided for determining a deferral period for deferring access to the wireless medium. The method further includes transmitting information indicating the process to one or more wireless devices operating within the network.

DETAILED DESCRIPTION

Figure 1:
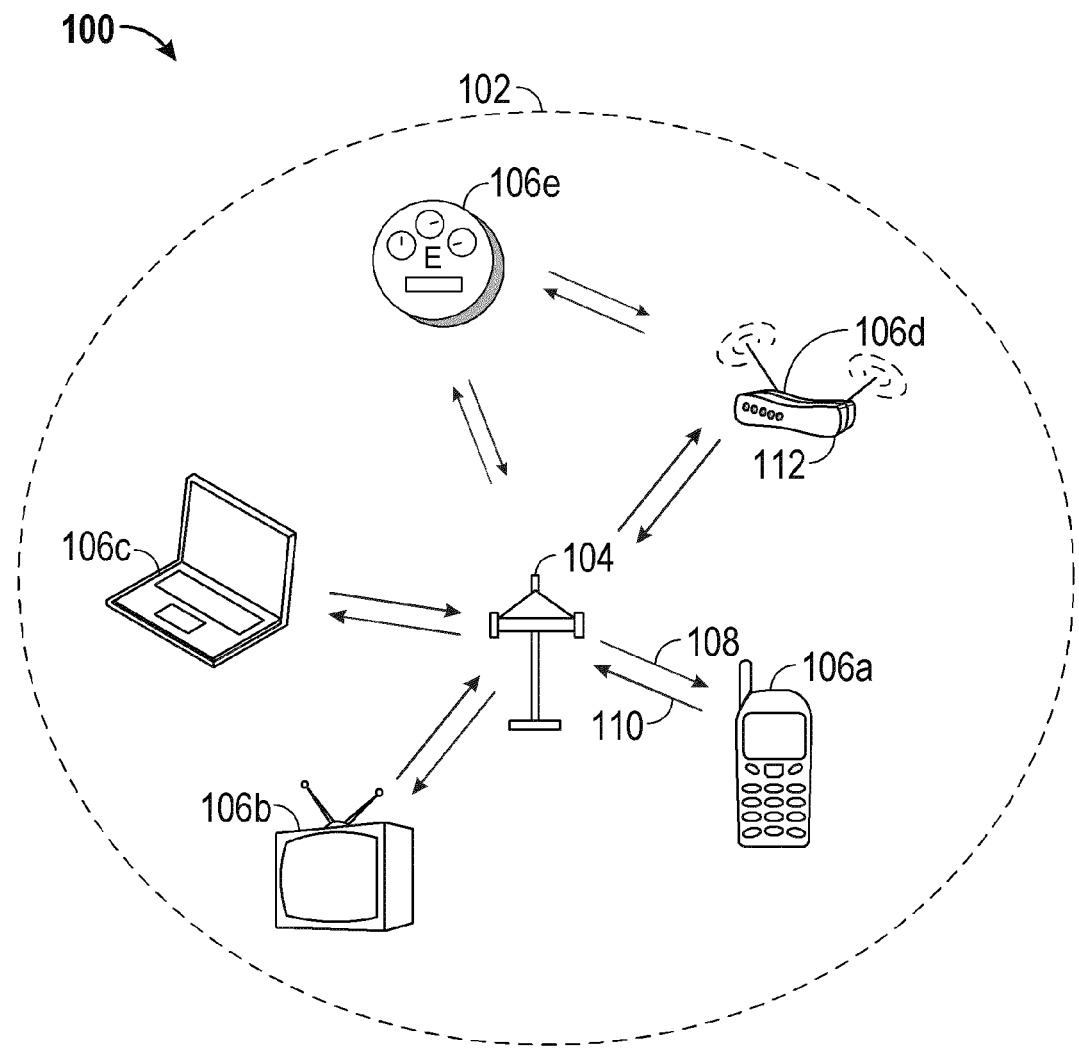
FIG. 1 illustrates an example of a wireless communication system in which aspects of the present disclosure may be employed.

Various aspects of the novel systems, apparatuses, and methods are described more fully hereinafter with reference to the accompanying drawings. The teachings of the disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes.

Certain of the devices described herein may further implement Multiple Input Multiple Output (MIMO) technology and be implemented as part of an 802.11 protocol. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure may be employed. The wireless communication system 100 may operate pursuant to a wireless standard, for example one or more of the IEEE 802.11 standards. The wireless communication system 100 may include an AP 104, which communicates with STAs 106a, 106b, 106c, 106d, and 106e (collectively STAs 106).

STA 106e may have difficulty communicating with the AP 104 or may be out of range and unable to communicate with the AP 104. As such, another STA 106d may be configured as a relay 112 that relays communications between the STA 106e and the AP 104.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
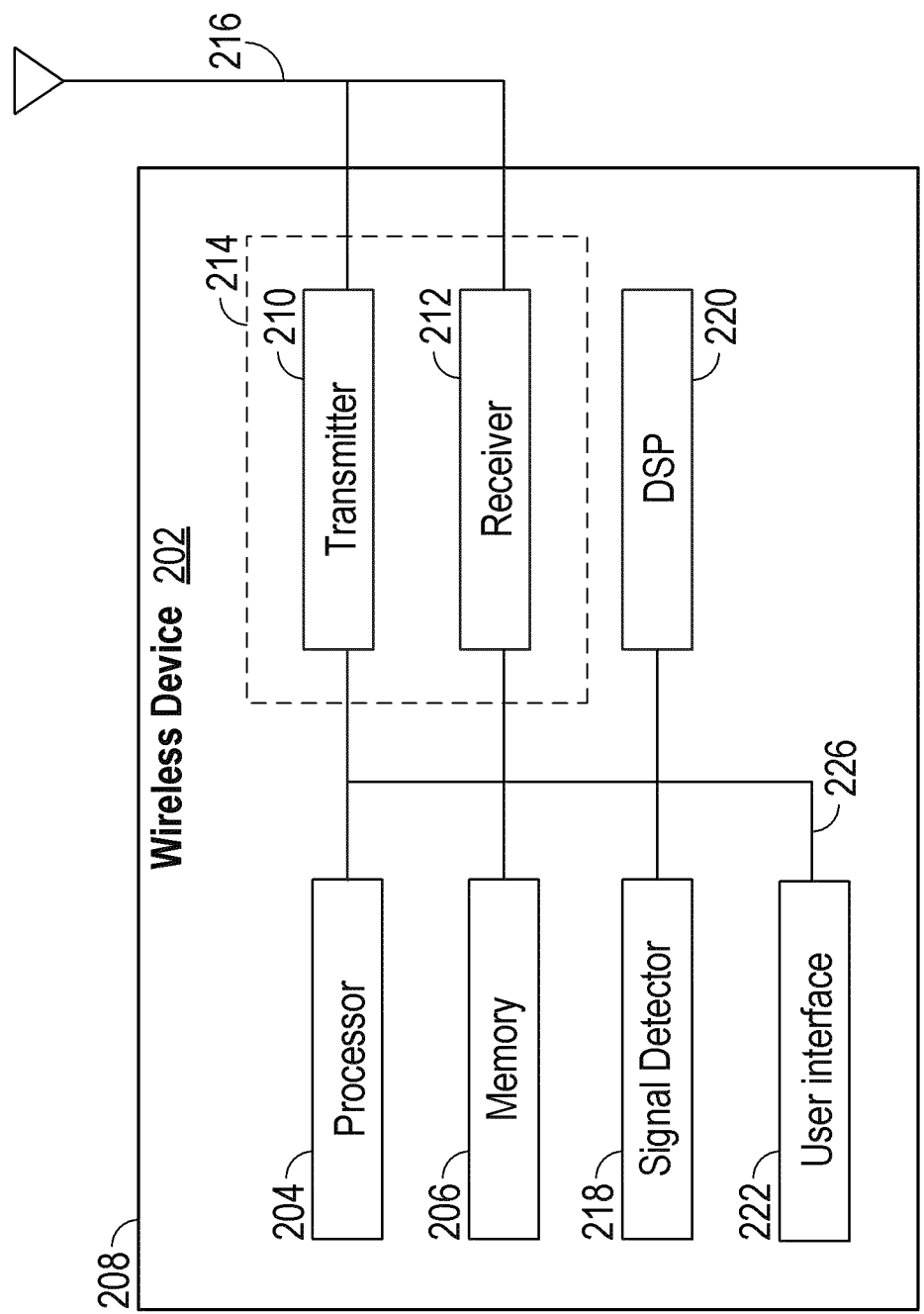
FIG. 2 shows a functional block diagram of an exemplary wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104, a relay 112, or one of the STAs 106 of FIG. 1.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to select one of a plurality of media access control (MAC) header types, and to generate a packet having that MAC header type. For example, the processor 204 may be configured to generate a packet comprising a MAC header and a payload and to determine what type of MAC header to use.

When the wireless device 202 is implemented or used as a receiving node, the processor 204 may be configured to process packets of a plurality of different MAC header types. For example, the processor 204 may be configured to determine the type of MAC header used in a packet and process the packet and/or fields of the MAC header.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different MAC header types. For example, the transmitter 210 may be configured to transmit packets with different types of headers generated by the processor 204, discussed above.

The receiver 212 may be configured to wirelessly receive packets having different MAC header type. In some aspects, the receiver 212 is configured to detect a type of a MAC header used and process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore, the processor 204 may be used to implement any of the components, modules, circuits, or the like described below, or each may be implemented using a plurality of separate elements.

A device in the wireless communication system 100 may implement only functionality of a transmitting node, only functionality of a receiving node, or functionality of both a transmitting node and a receive node.

As discussed above, the wireless device 202 may comprise an AP 104 or a STA 106, and may be used to transmit and/or receive communications having a plurality of MAC header types. As discussed above, the wireless device 202 may comprise an AP 104 or an STA 106, and may be used to transmit and/or receive communications.

Figure 3:
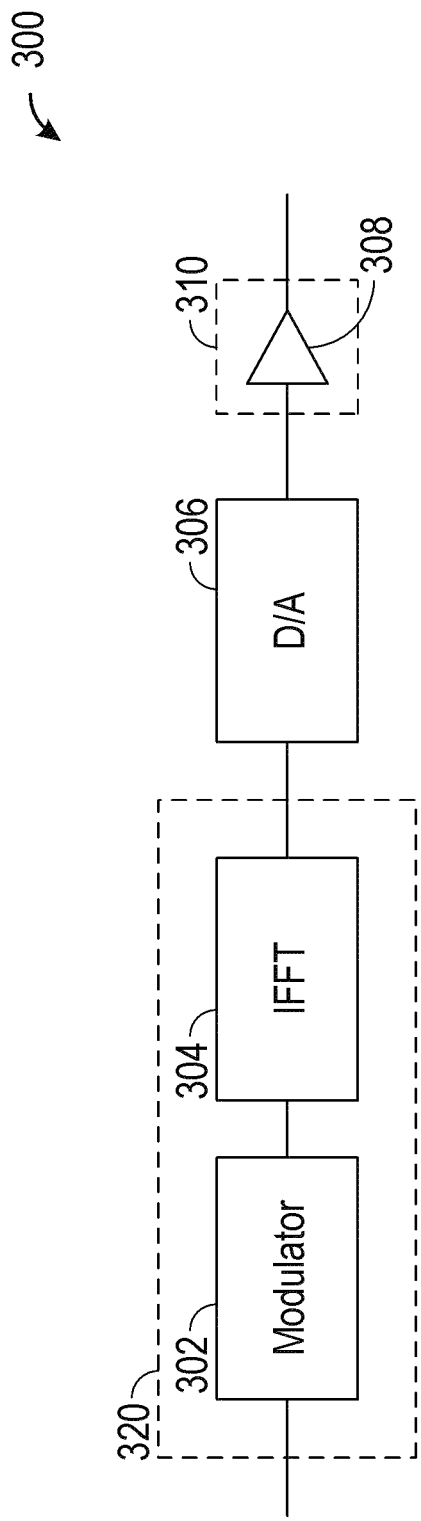
FIG. 3 shows a functional block diagram of exemplary components that may be utilized in the wireless device of FIG. 2 to transmit wireless communications.

FIG. 3 illustrates various components that may be utilized in the wireless device, such as wireless device 202 of FIG. 2, to transmit wireless communications. The components illustrated in FIG. 3 may be used, for example, to transmit OFDM communications. In some aspects, the components illustrated in FIG. 3 are used to generate and transmit packets to be sent over a bandwidth of less than or equal to 1 MHz.

The wireless device 300 may comprise a modulator 302 configured to modulate bits for transmission. In some aspects, the modulator 302 comprises a binary phase-shift keying (BPSK) modulator or a quadrature phase-shift keying (QPSK) modulator. The wireless device 300 may further comprise a transform module 304 configured to convert symbols or otherwise modulated bits from the modulator 302 into a time domain. The transform module 304 may be implemented by an inverse fast Fourier transform (IFFT) module. In some aspects, the modulator 302 and the transform module 304 may be implemented in a DSP 320. These elements may also be implemented in another element of a wireless device, such as in processor 204 of FIG. 2.

The wireless device 300 may further comprise a digital to analog converter 306 configured to convert the output of the transform module into an analog signal. The analog signal may be wirelessly transmitted by the transmitter 310. In some aspects, the transmitter 310 may include a transmit amplifier 308. The amplifier 308 may comprise a low noise amplifier (LNA).

Figure 4:
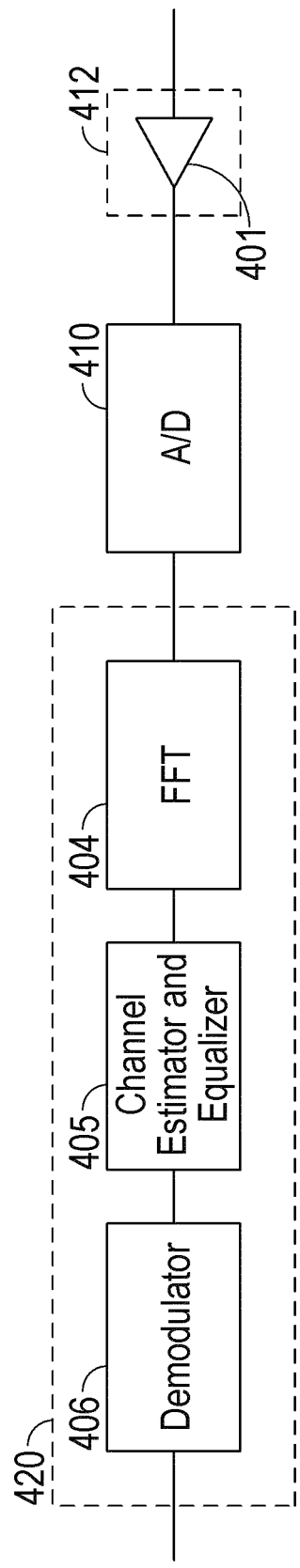
FIG. 4 shows a functional block diagram of exemplary components that may be utilized in the wireless device of FIG. 2 to receive wireless communications.

FIG. 4 illustrates various components that may be utilized in the wireless device, such as wireless device 202 of FIG. 2, to receive wireless communications. The receiver 412 of wireless device 400 is configured to receive one or more packets or data units in a wireless signal. The receiver 412 includes a receive amplifier 401.

The wireless device 400 may comprise an analog to digital converter 410 configured to convert the amplified wireless signal from the receiver 412 into a digital representation thereof. The wireless device 400 may further comprise a transform module 404 configured to convert the representation of the wireless signal into a frequency spectrum. In FIG. 4, the transform module 404 is illustrated as being implemented by a fast Fourier transform (FFT) module.

The wireless device 400 may further comprise a channel estimator and equalizer 405 configured to form an estimate of the channel over which the data unit is received, and to remove certain effects of the channel based on the channel estimate. The wireless device 400 may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation.

In FIG. 4, the transform module 404, the channel estimator and equalizer 405, and the demodulator 406 are illustrated as being implemented in the DSP 420. In some aspects, however, one or more of the transform module 404, the channel estimator and equalizer 405, and the demodulator 406 may be implemented by a processor, such as processor 204 of FIG. 2.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

The wireless network 100 may employ methods to allow efficient access of the wireless medium based on unpredictable data transmissions while avoiding collisions. As such, in accordance with various embodiments, the wireless network 100 performs carrier sense multiple access/collision avoidance (CSMA/CA) that may be referred to as the Distributed Coordination Function (DCF). More generally, a wireless device 202 having data for transmission senses the wireless medium to determine if the wireless medium is already occupied. If the wireless device 202 senses the wireless medium is idle then the wireless device 202 transmits prepared data. Otherwise, the wireless device 202 may defer for some period before determining again whether or not the wireless medium is free for transmission. A method for performing CSMA may employ various gaps between consecutive transmissions to avoid collisions. In some aspects, a transmission may be referred to as a frame. When there is a time interval between two transmissions, this time interval may be referred to as Interframe Spacing (IFS). Frames may be any one of user data, control frames, management frames, and the like.

IFS time durations may vary depending on the type of time gap provided. Some examples of IFS include a Short Interframe Spacing (SIFS), a Point Interframe Spacing (PIFS), and a DCF Interframe Spacing (DIFS) where SIFS is shorter than PIFS which is shorter than DIFS. Generally, transmissions which follow after a shorter gap, such as after a SIFS, may be higher priority transmissions than those which follow after a longer gap, such as a DIFS.

Figure 5:
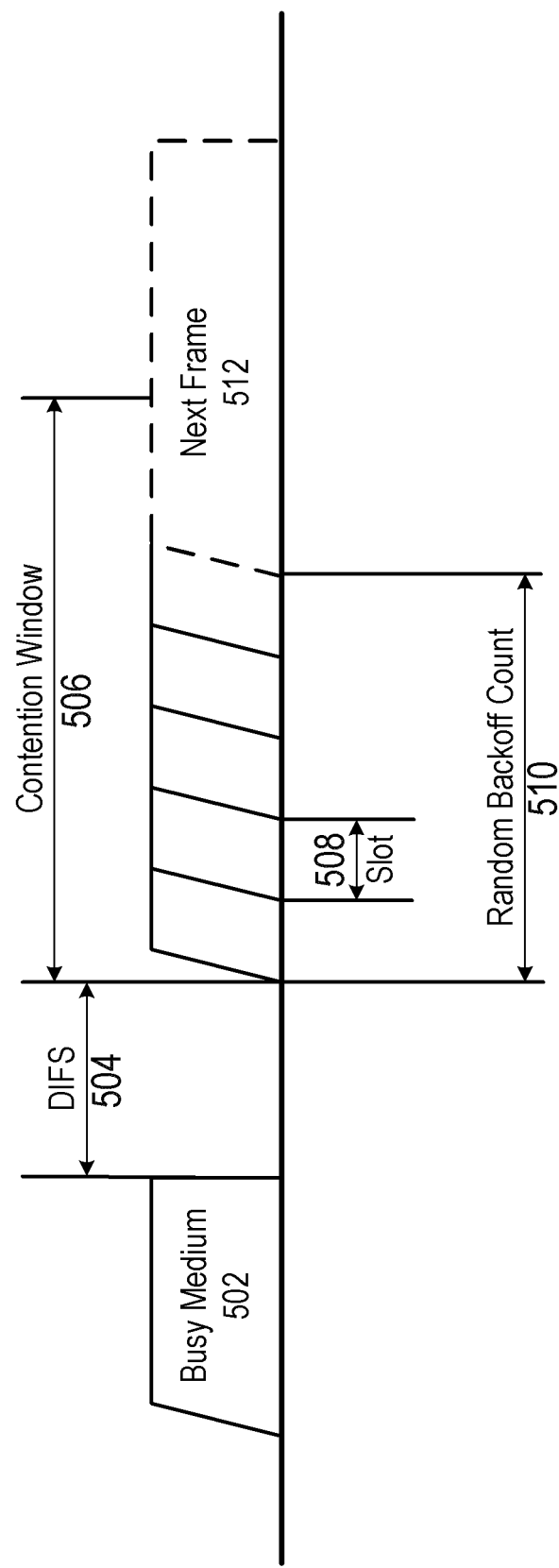
FIG. 5 is a diagram showing time intervals used in a CSMA scheme that may be employed by a wireless device of FIG. 2 operating in the wireless network of FIG. 1, in accordance with an embodiment.

FIG. 5 is a diagram showing time intervals used in a CSMA scheme that may be employed by a wireless device 202 of FIG. 2 operating in the wireless network 100 of FIG. 1. To avoid collisions, a wireless device 202 that has prepared a frame for transmission first senses the wireless medium. The wireless device 202 may determine that the wireless medium is busy as shown by time interval 502, based on either carrier sense (CS) or energy detection (ED). For example, in an energy detection clear channel assessment, the wireless device 202 may measure the average amount of energy transmitted on a given frequency spectrum, to determine whether the wireless medium is busy. Alternatively, in a carrier sense clear channel assessment, the wireless device 202 may attempt to detect and decode incoming Wi-Fi signal preambles on the wireless medium. Either of these methods may be used to determine whether or not the medium is in use, as is known to those of skill in the art. If the wireless medium is busy, the wireless device 202 defers for a fixed time duration such as the DCF Interframe Spacing (DIFS) as shown by the DIFS time interval 504. In addition to deferring for the DIFS time interval, the wireless device 202 may also defer for some portion of a contention window 506. The contention window 506 is divided into a number of time slots, such as by time slot 508. The wireless device 202 pseudo-randomly selects a number of time slots within the contention window 506 to further defer access to the wireless medium beyond the DIFS time interval 504. This is shown by the random backoff count 510 time interval which selects some number of slots less than or equal to the number of slots in the contention window 506.

After selecting the random backoff count 510, the wireless device 202 further defers and senses the wireless medium during each slot 508 of the random backoff count 510. If the wireless medium continues to be idle for the duration of the random backoff count 510, the wireless device 202 may transmit a frame as indicated by the next frame 512. If the wireless device 202 senses that the wireless medium is busy during any of the slots of the random backoff count 510, the wireless device 202 waits until the medium is idle, defers for a DIFS period, and then resumes the backoff count 510. For example, the random backoff count 510 may be pseudo-randomly determined to be six slots. After deferring for 3 slots, the wireless device 202 may sense that the wireless medium is busy. In response, the wireless device 202 waits until the wireless medium becomes idle, defers for a DIFS period, and then resumes counting down for 3 additional slots, which is the number of slots remaining in the previous countdown. Because of the pseudo-random determination of slots, multiple devices attempting to transmit will select a different number of slots such that each will defer for a different amount of time to prevent collisions and allow each wireless device 202 to transmit prepared frames.

The size of the contention window 506 may be a function of the number of unsuccessful transmissions. For example, the initial size of the contention window 506 may be set to a minimum contention window size (e.g., CWmin) that is used after successful transmissions. When the size of the contention window 506 is at the minimum size, the number of slots chosen for the random backoff is selected to be less than or equal to the minimum contention window size. If a transmission is unsuccessful, it may be assumed that a collision could have occurred. As such, the size of the contention window 506 (i.e., number of slots) may be increased. An increase in the size of the contention window 506 may make it more likely that the random backoff count 510 will be larger. For example, the size of the contention window 506 may double for each unsuccessful frame transmission until the size of the contention window 506 is at a maximum size (e.g., CWmax).

The number of wireless devices within the network 100 and contending for the same wireless medium may impact the performance of the CSMA mechanism. As the number of devices operating within the network increases, the CSMA mechanism may not be able to adequately support the number of transmissions found in a dense network. For example, as a non-limiting illustration, if the contention window is set to 10 slots, but there are 30 or more devices contending for the wireless medium, it is likely that several wireless device may choose the same random backoff count 510. This may lead to collisions and/or devices experiencing long delays when waiting for the wireless medium to be sufficiently idle to allow the wireless device 202 to transmit prepared data.

In accordance with one or more embodiment described herein, the CSMA mechanism may be modified to support more users. For example, modifications according to embodiments described herein may allow an access point 104 to support a greater number of wireless devices. In addition, these modifications may allow a greater number of wireless devices to access the wireless medium more efficiently. In addition, there may be less "wasted" time, and overall efficiency of the CSMA mechanism may be improved. As such, in accordance with one embodiment, the process by which time slots are "counted-down" after selection of the random backoff count may be modified. In accordance with another embodiment, the parameters of the deferral periods may be modified. In accordance with yet another embodiment, additional actions may be taken in addition to those described with reference to FIG. 5 by the wireless device. Any of these embodiments may be used alone or in combination with each other.

As just described, in accordance with one embodiment the mechanism by which to count-down slots may be modified. For example, in accordance with an embodiment, after selection of a number of time slots corresponding to the random backoff count 510, a wireless device 202 counts down using only a sub-set of all time slots (i.e., any subsequent time slots). This is in contrast to starting with a time slot and counting down for each immediate subsequent time slot. The sub-set of time slots used by the wireless device 202 to countdown may be a function of a "group" that the wireless device 202 belongs to. As such, certain groups of users can be assigned different time slots within the contention window 506 for use in counting down.

Figure 6A:
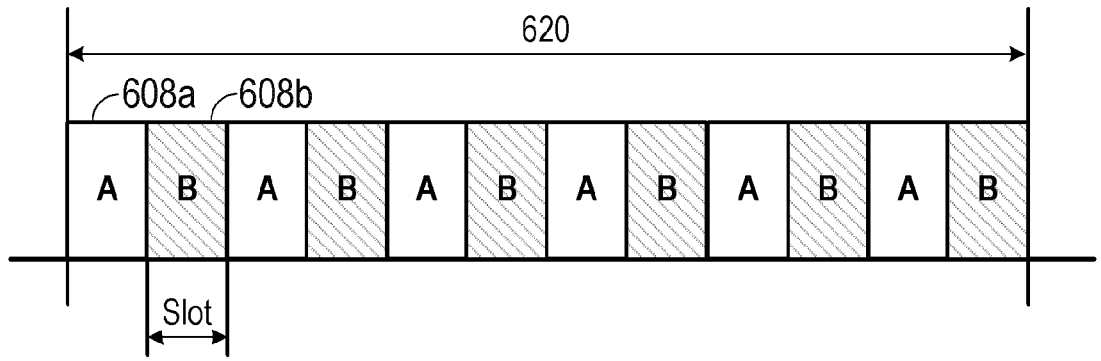
FIGS. 6A, 6B, and 6C are diagrams of a series of time slots showing assigned time slots and for use in a deferral countdown mechanism by multiple wireless devices, in accordance with an embodiment.

FIG. 6A is a diagram of a series of time slots 620 showing assigned time slots 608a and 608b for use in a deferral countdown mechanism by multiple wireless devices. The series of time slots 620 is divided into 'A' time slots and 'B' time slots. A wireless device 202 may be assigned to count down only during the 'A' time slots, where the number of time slots to count down is determined by a random backoff count. As an example, a wireless device 202 assigned to the 'A' slots may select 4 time slots as the random backoff count. The wireless device 202 may start with the first 'A' slot 608a and then count down the number of time slots for deferral based only on the subsequent 'A' time slots. As such, the total deferral period may be eight total slots. In one aspect, the slots may be labeled in such a way that the wireless device 202 may count down on the even time slots while another wireless device 202 may count down on the odd time slots. For example, another wireless device 202 may be assigned to only use the 'B' time slots when counting down based on the random backoff count. As described above the assignment of slots may be based on a grouping of wireless devices. For example, all wireless devices belonging to a first group may count down on the 'A' time slots, while all the wireless devices belonging to a second group may count down on the 'B' time slots. In FIG. 6A, it is illustrated that there are two groups ('A' and 'B'), however, there may be any number of groups. For example, there may be more groups in networks with larger numbers of wireless devices 202.

Figure 6B:
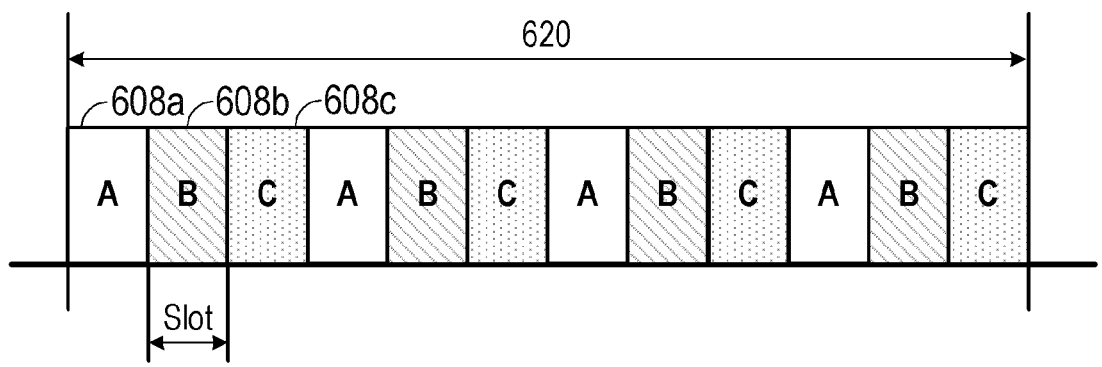

There may be a variety of different ways to determine the sub-set of slots assigned to a wireless device 202 for use in counting down. FIG. 6B is a diagram of a series of time slots 620 showing another example of assigned time slots 608a, 608b, and 608c for use in a deferral countdown mechanism by multiple wireless devices. In FIG. 6B, three groups of assigned time slots are shown: group 'A,' group 'B'; and group 'C.' A wireless device 202 assigned the 'A' time slots counts down only based on the 'A' time slots, and similarly for wireless devices assigned to the 'B' time slots and the 'C' time slots. The assigned time slots may be defined by a function, for example such that a first wireless device 202 only counts down on time slots such that mod(slotnumber,3)=0, a second wireless device 202 only counts down on time slots such that mod(slotnumber,3)=1, and a third wireless device 202 only counts down on time slots such that mod(slotnumber,3)=2. Each of the wireless devices 202 may belong to a group of wireless devices, each group being assigned a different subset of slots.

Figure 6C:
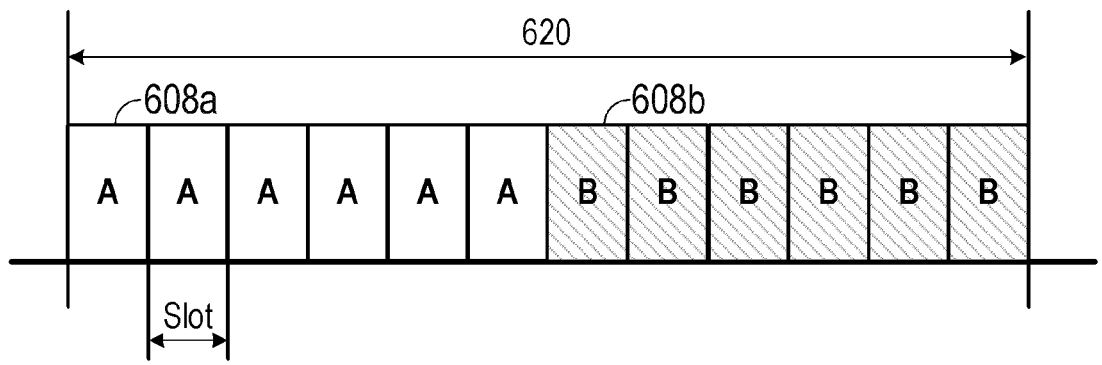

FIG. 6C is a diagram of a series of time slots 620 showing another example of assigned time slots 608a and 608b for use in a deferral countdown mechanism by multiple wireless devices. Rather than sub-sets of assigned time slots for a wireless device 202 alternating between other sub-sets of assigned time slots, the assigned sub-set of time slots may define a contiguous sub-set of assigned time slots. For example, a wireless device 202 assigned to the 'A' time slots may countdown on the first half of the slots, while a different wireless device 202 assigned to the 'B' time slots may countdown on the second half of the time slots. In accordance, the sub-set of assigned time slots may correspond to any configuration of sub-set of time slots of series of time slots 620.

While FIGS. 6A, 6B, and 6C may only show two to three different sub-sets of time slots, it is noted that the series of time slots 620 may be divided into any number of different numbers of sub-sets of time slots and configurations of each sub-set. Furthermore, different groups of wireless devices may be assigned to use any of the defined sub-sets. Using different sub-sets of time slots for counting down based on the selected random backoff count reduces the number of transmissions of other wireless devices that each device must contend with.

The particular sub-set of time slots assigned to a wireless device 202 to use to countdown may be based on a variety of different operating characteristics and wireless device properties. For example, an assignment of a sub-set of time slots may be based on one or more of the Media Access Control Address (MAC Address) of the wireless device 202, the group ID of the wireless device 202, a Quality of Service (QoS) class, a latency requirement, a throughput requirement, traffic patterns, and the like. An example of a traffic pattern may be where a wireless device 202 is transmitting substantially only short "bursts" of data in smaller frames as compared to other types of frames with longer data. A wireless device 202 may receive an assignment of a subset from an access point 104, for example during an association procedure. In some aspects, a wireless device 202 may be configured to determine the assigned sub-set based on one or more known properties. For example, the wireless device 202 may be configured to use a hash of different properties to map to an assigned sub-set of slots. Examples of the properties used by the hash could include the MAC Address, a group ID, a QoS class, and the like.

Figure 7:
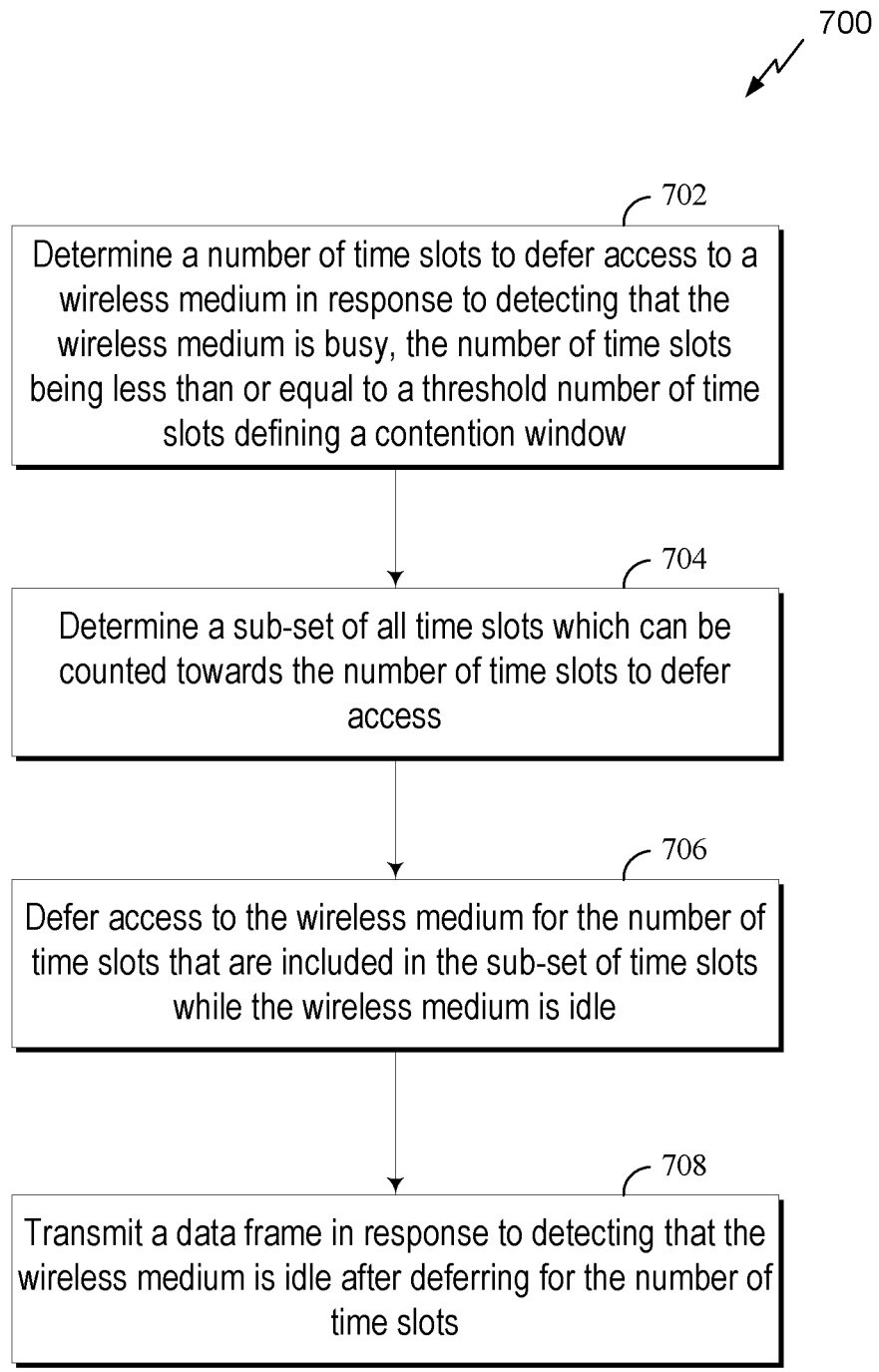
FIG. 7 is a flowchart of an implementation of a method of deferring access to a wireless medium, in accordance with an embodiment.

FIG. 7 is a flowchart of an implementation of a method 700 of deferring access to a wireless medium, in accordance with an embodiment. At block 702, a number of time slots to defer access to a wireless medium is determined in response to detecting that the wireless medium is busy. The number of time slots is less than or equal to the number of time slots defining a contention window 506. For example, the number of time slots may correspond to the random backoff count 510 (see FIG. 5). At block 704, a sub-set of time slots of all time slots which can be counted towards the number of time slots to defer access is determined. For example, the sub-set may correspond to any different sub-sets of subsequent time slots. Examples of the sub-sets are shown in FIGS. 6A, 6B, and 6C.

At block 706, access to the wireless medium is deferred for the number of time slots that are included in the sub-set of time slots while the wireless medium is idle. For example, the number of time slots determined at block 702 will be counted down, but the countdown of slots corresponds only to the slots within the sub-set of time slots. At block 708, a data frame is transmitted in response to detecting that the wireless medium is idle after deferring for the number of time slots.

As also described above, in accordance with another embodiment, the parameters for choosing deferral periods for CSMA may be modified. For example, the countdown mechanism itself, such as the assignment of different timeslots to different classes as in FIGS. 6A, 6B, 6C, may remain the same while the parameters, such as the minimum or maximum value of a random back-off counter, may be modified. In some embodiments, both the countdown mechanism and the parameters may be simultaneously modified.

In one embodiment, the size of the contention window 506 (FIG. 5) may be modified based on one or more detected network conditions. For example, the minimum size of the contention window may be modified based on a network operating characteristic. The network operating characteristic may correspond to a number of wireless devices operating within the network, the number of wireless devices with an amount of average data higher than a threshold, a traffic pattern of the wireless devices, and the like. For example, a traffic pattern may correspond to the type or length of frames most commonly being transmitted by one or more wireless devices. For example, when the number of wireless devices operating within the network reaches a threshold, the number of time slots in the CWmin is increased such that the average random backoff count selected by the wireless device 202 is increased and there is less likelihood that multiple wireless devices would select the same random backoff count. Likewise, the CWmin may be decreased for example based on the traffic pattern, and the like.

In some embodiments, an access point 104 notifies wireless devices of the modified contention window. For example, where the modified contention window may not often change, an access point 104 may inform a wireless device 202 of the modified CWmin during an association process. In addition, the access point 104 may advertise a modified CWmin in beacon messages transmitted periodically by the access point 104 to inform any listening wireless devices 202 of network operating characteristics (e.g., beacons arriving at DTIM intervals). In accordance with this embodiment, an access point 202 in communication with a large number of wireless devices may improve throughput if the wireless devices begin with a larger CWmin, rather than waiting for errors to cause the CWmin to increase.

Figure 8A:
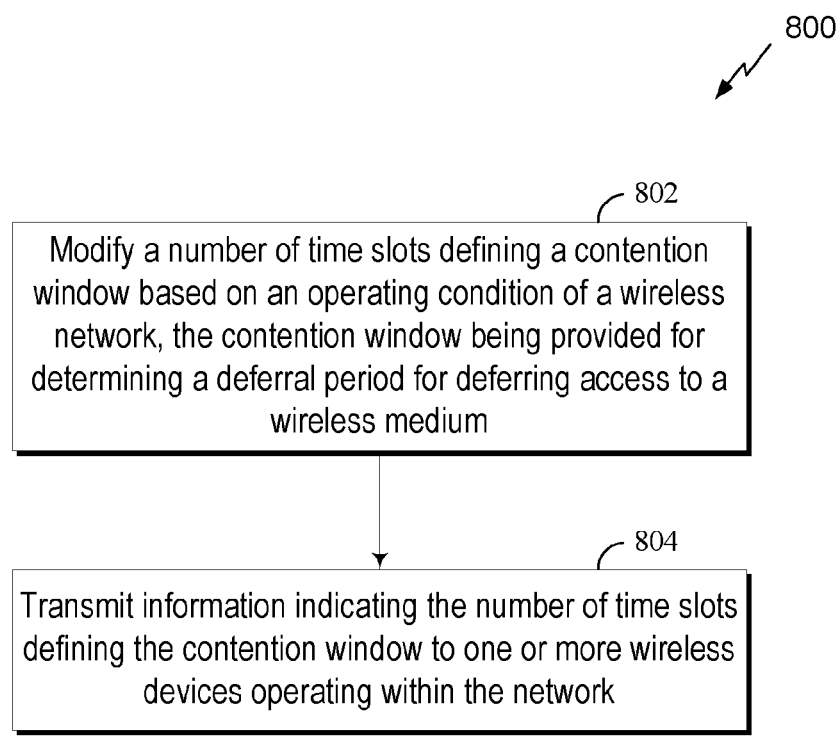
FIG. 8A is a flowchart of a method of modifying a CSMA parameter, in accordance with an embodiment.

FIG. 8A is a flowchart of a method 800 of modifying a CSMA parameter, in accordance with an embodiment. At block 802, a number of time slots defining a contention window 506 is modified based on an operating characteristic of a wireless network 100. The contention window 506 is provided for determining a deferral period for deferring access to a wireless medium. For example, the deferral period may correspond to the random backoff count 510 which is selected from within the contention window 506. The number of slots may be modified based on the number of wireless devices in the network, or in the Basic Service Set (BSS). For example, the number of slots defining the contention window may be increased if the number of users is above a threshold. At block 804, information indicating the modified number of time slots defining the contention window is transmitted to one or more wireless devices operating within the network 100. For example, an access point 104 may modify the number of time slots defining the contention window and transmit this value to one or more wireless devices.

Figure 8B:
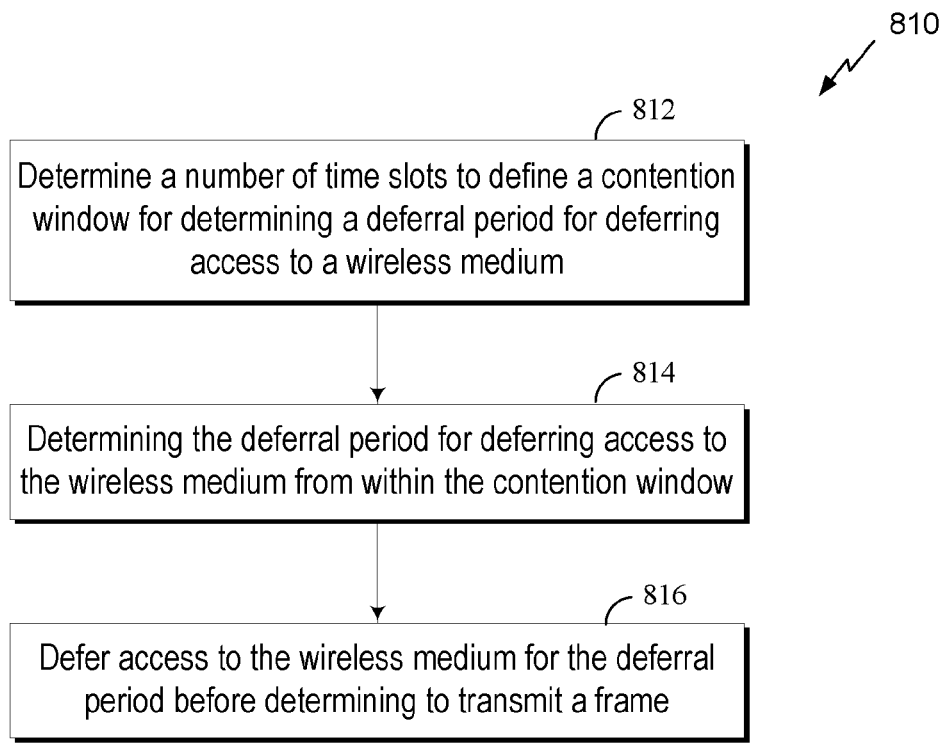
FIG. 8B is a flowchart of another method for modifying a CSMA parameter, in accordance with an embodiment.

FIG. 8B is a flowchart of another method 810 for modifying a CSMA parameter, in accordance with an embodiment. At block 812, a number of time slots to define a contention window is determined. The number of time slots defines a deferral period for deferring access to the wireless medium. For example, the deferral period may correspond to the random backoff count selected within the contention window. The number of time slots may be determined based on a message received from an access point 104 or as assigned by the access point 104. At block 814, the deferral period for deferring access to the wireless medium from within the contention window is determined. At block 816, access to the wireless medium is deferred for the deferral period before determining to transmit a frame.

As described above with reference to FIG. 5, when a wireless device 202 successfully transmits a frame, the size of the contention window is reset to CWmin. In some cases, where CWmin is relatively small, resetting the size of the contention window to CWmin may result in unsuccessful transmission of a subsequent frame and an increased deferral period. Stated another way, if CWmin is low relative to the number of wireless devices contending for the medium, more collisions may happen every time a successful packet is transmitted. As such, performance may be sensitive to the size of CWmin, and it may be beneficial to use larger values of CWmin in networks which contain larger numbers of wireless devices or networks which have more transmissions.

In one embodiment, a protocol or similar framework may be provided for determining how to set the size of the contention window in response to the successful transmission of a frame and for setting the size of CWmin and CWmax. In an embodiment, the AP 104 may send information to wireless devices in communication with the AP 104 that instructs devices to set the size of the contention window in response to the successful transmission of a frame by the wireless devices. In one aspect, the AP 104 may instruct the wireless devices regarding the values of one or both of CWmin and CWmax. The AP 104 may determine the information based on one or more detected network conditions, for example, such as the number of wireless devices in the network, number of idle slots observed, number of un-decodable 'busy' slots observed, and the like.

In accordance with an embodiment, the information transmitted by the AP 104 to inform wireless devices to set the size of the contention window subsequent to a successful transmission may indicate that rather than resetting to CWmin, the size of the contention window is reduced by some factor. For example, the size of the contention window may be reduced linearly or exponentially in accordance with an embodiment. For a linear reduction, a wireless device 202 is configured to reduce the contention window size by subtracting a constant factor. For an exponential reduction, a wireless device 202 is configured to reduce the contention window size by multiplying by a constant factor. In high congestion scenarios, linear reduction may be desirable as a wireless device 202 may be able to converge to an appropriate value of contention window.

In accordance with an embodiment, the AP 104 is configured to detect one or more network operating characteristics. The one or more network operating characteristics may be associated with the load of the network such as the number of wireless devices, the number of idle slots observed, the number of "busy" slots that are un-decodable (indicating a collision), an estimated probability of collisions, and the like. Each of these factors may be compared to a threshold, such as either an upper threshold or a lower threshold. In response, the AP 104 transmits instructions to wireless devices to set the size of the contention window in response to a successful transmission. In an aspect, the information may be sent in beacons and/or probe responses. For example, the AP 104 may send information, in response to detecting a network operating characteristic, to indicate to a wireless device to one of reset the contention window to CWmin, to decrement the size of the contention window linearly, or decrement the size of the contention window exponentially in response to a successful transmission. In addition, in some cases, the AP 104 may further send information setting the values of CWmax and CWmin for the wireless devices to use. For example, the AP 104 may adjust CWmax to be proportional to the number of wireless devices in communication with the AP 104. Also, the AP 104 may adjust CWmin to be proportional to the number of wireless devices in communication with the AP 104.

As an example, if the AP 104 detects that the number of effective wireless devices is above a threshold, the AP 104 transmits information indicating that the wireless devices within the network switch to a linear back off of contention window upon successful transmission, rather than resetting. In another example, if the number of effective wireless devices is above a threshold, each time an additional threshold number of wireless devices arrive or leave, the CWmin and CWmax parameters are adjusted or policy for decrementing is adjusted. The updated values may be transmitted by the AP 104.

In another embodiment, the AP 104 transmits network load information to the wireless devices. For example, the network load information may be transmitted in a beacon and/or probe response. A wireless device 202 receives this information and is configured to adjust the size of the contention window based on a successful or fail transmission based on the information. The determination adjustments the size may be defined by the protocol being used.

In addition, in another embodiment, a wireless device 202 sends the AP 104 the probability of the wireless device 202 of successfully accessing the wireless medium. These metrics may include the percentage of packets being retransmitted and the like. The metrics may be transmitted in other existing messages. The AP 104 receives this information and uses the information to adjust CWmin, CWmax and the contention window size decrement strategy (e.g., reset, linear, exponential).

Figure 9A:
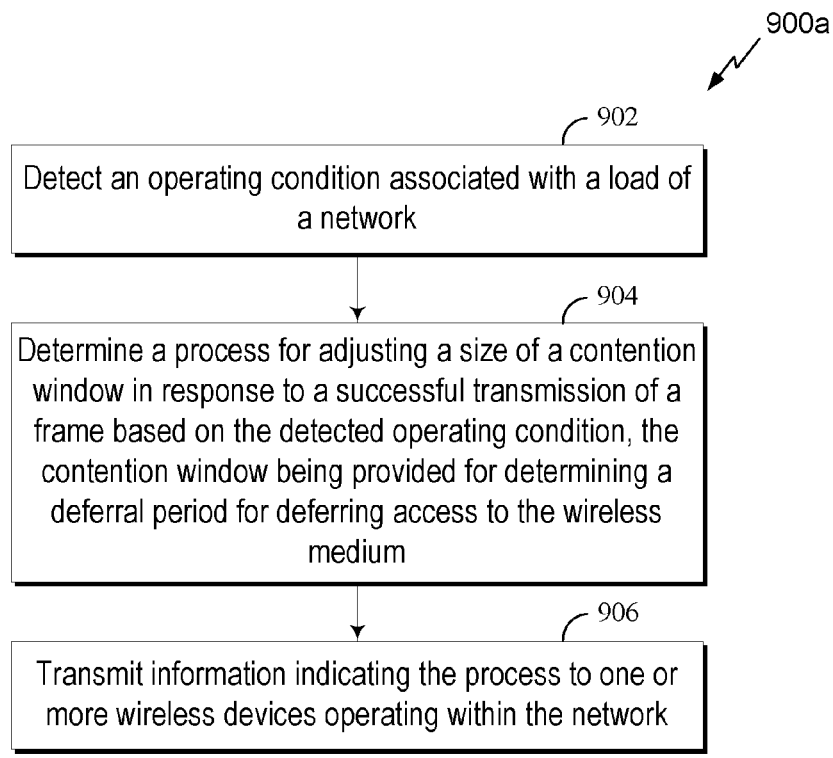
FIG. 9A is a flowchart of an exemplary method of determining a process for adjusting a size of a contention window in response to a successful frame transmission, in accordance with an embodiment.

FIG. 9A is a flowchart of an exemplary method 900a of determining a process for adjusting a size of a contention window in response to a successful frame transmission, in accordance with an embodiment. At block 902, an operating characteristic associated with a load of a network is detected. For example, the operating characteristic could correspond to a number of wireless devices operating in the network being above at threshold or some other detection based on the number of frames, or un-decodable frames, and the like. Stated another way, a parameter indicative of a load of a network may be determined. At block 904, a process for adjusting a size of a contention window in response to a successful transmission of a frame is determined based on the operating characteristic (and/or based on the parameter associated with the network load). As described above, the contention window is provided for determining a deferral period for deferring access to the wireless medium, e.g., when the wireless medium is detected as busy. At block 906, information indicating the process is transmitted to one or more wireless devices operating within the network. For example, an AP 104 may be configured to perform one or more of the function described with respect to blocks 902 and 904 and transmit the information to wireless devices in communication with the AP 104, such that the wireless devices, in response to receiving the information, use the determined process for adjusting the size of the contention window when the wireless devices successfully transmit a frame. In some aspects, a STA may perform method 900*a*. In some aspects, rather than transmitting information based on the process, the STA may instead adjust the size of the contention window within the STA based on the process. For example, each device on the network may be configured to adjust the size of its own contention window, based on operating characteristics of the network. In some aspects, these adjustments may be made independently of the adjustments of other devices on the network. Allowing each device to make these adjustments may reduce network bandwidth usage, as information about the contention window size may not need to be transmitted on the network. In some aspects, allowing STAs to adjust their own contention window size may also allow more frequent updates to the size of contention windows, based upon current network conditions.

In another embodiment, a wireless device 202 may itself determine network load information (e.g., determine the size of its neighborhood). For example a wireless device 202 may determine an estimate of how many other wireless devices are attempting to transmit. In an aspect, the wireless device 202 counts packets that come from other wireless devices and detects if the frames are from several different wireless devices or only from a few wireless devices. Based on this information, the wireless device 202 sets the size of the contention window after a successful or unsuccessful packet transmission similarly as described above.

Figure 9B:
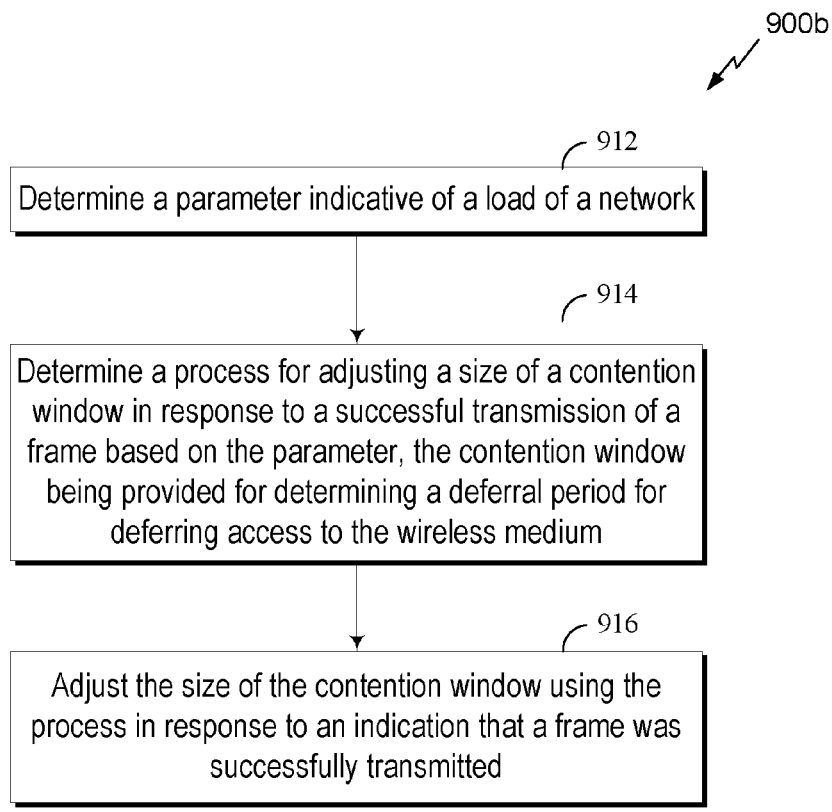
FIG. 9B is a flowchart of another exemplary method of determining a process for adjusting a size of a contention window in response to a successful frame transmission, in accordance with an embodiment.

FIG. 9B is a flowchart of another exemplary method 900*b* of determining a process for adjusting a size of a contention window in response to a successful frame transmission, in accordance with an embodiment. At block 912, a parameter indicative of a load of a network is determined. A wireless device 202 such as a STA 106 may be configured to perform the function of block 912. As described above, the parameter may be based on determining a number of distinct wireless devices that are transmitting information by analyzing received frames. At block 914, a process for adjusting a size of a contention window in response to a successful transmission of a frame is determined based on the parameter. At block 916, the size of the contention window is adjusted using the determined process in response to an indication that a frame was successfully transmitted. The process may correspond to any one of resetting the size of the contention window to CWmin, reducing the size of the contention window linearly from the current contention window size when the frame was successfully transmitted, reducing the size of the contention window exponentially from the current contention window, or any combination thereof and the like.

As described above, the size of the contention window, and particularly CWmin and CWmax may be scaled linearly with the number of users. As such, the AP 104 or wireless device 202 may be configured to manage the number of time slots in CWmin and CWmax and adjust the size as a function of the number of users, or the effective number of users. In some aspects, if some users are idle or send little users, these users may not count as a full user. For example, an effective number of active wireless users may be calculated, which counts idle users and users who send little data as less than a full user. Such an effective number of active wireless users may be useful, as these inactive users may not use up the same amount of network bandwidth as active users. The AP 104 transmits these adjusted values to wireless devices in communication with the AP 104. Scaling CWmin and CWmax linearly with the number of users may increase the probability that contending wireless devices pick different slots. For example, for M users and N slots, the probability that one wireless device 202 selects a slot that no other wireless device 202 selects may be defined as: 1/N*(M−1)*(N−1)/N which is substantially equivalent to M*N/NA2=MN. Given this result, in one aspect, scaling CWmin and CWmax linearly may increase the probability that contending wireless devices select different slots for some scenarios.

Linear scaling of CWmin and CWmax is further shown to increase the probability of contending wireless devices selecting different slots in some cases. The probability that out of M users and N slots, no two users pick the same slot may be defined by $e^{-(M^2/2N)}$. The probability of collision may scale with the number of slots. This may keep the collision probability per slot constant. The probability of collision may be defined as $1-e^{-(MA2/2N)}$ which is approximately equal to $1-(1-M^2/2N)=M^2/2N$. $M^2/2N$ should be proportional to p*N where p is the probability that 2 nodes collide. In other words, M & N may scale linearly to maintain the probability constant in some scenarios.

In addition to, and in accordance with the above embodiments, in another embodiment different wireless devices in the network may define and use different CSMA parameters. For example, in an embodiment, a wireless device 202 operating as an AP 104 may have different CSMA parameters than a wireless device 202 operating as a STA 106. Any one of the CSMA parameters described herein may be different for different wireless devices. For example, the AP 104 may use different values for CWmin and CWmax as compared to STAs 106 in communication with the AP 104. Furthermore, the AP 104 may employ a different strategy for adjusting the size of the contention window in response to a successful transmission (e.g., reset to CWmin, linear reduction, exponential reduction) as compared to STAs 106 in communication with the AP 104. This may allow for adjusting which wireless devices are more likely to gain access to the wireless medium, or optimize CSMA parameters based on the timing and types of frames sent and received by different wireless devices (e.g., the AP 104 as compared to a STA 106*a*.

In accordance with another embodiment, additional actions may be taken in addition to those described with reference to FIG. 5 by the wireless device 202 in accordance with the CSMA mechanism. In one aspect, in this case the countdown mechanism and CSMA parameters may remain the same as that described with reference to FIG. 5, while additional actions may be taken to further improve performance of the CSMA mechanism. However, it is noted that in some embodiments any combination of the above in addition to the additional actions may be provided.

Figure 10:
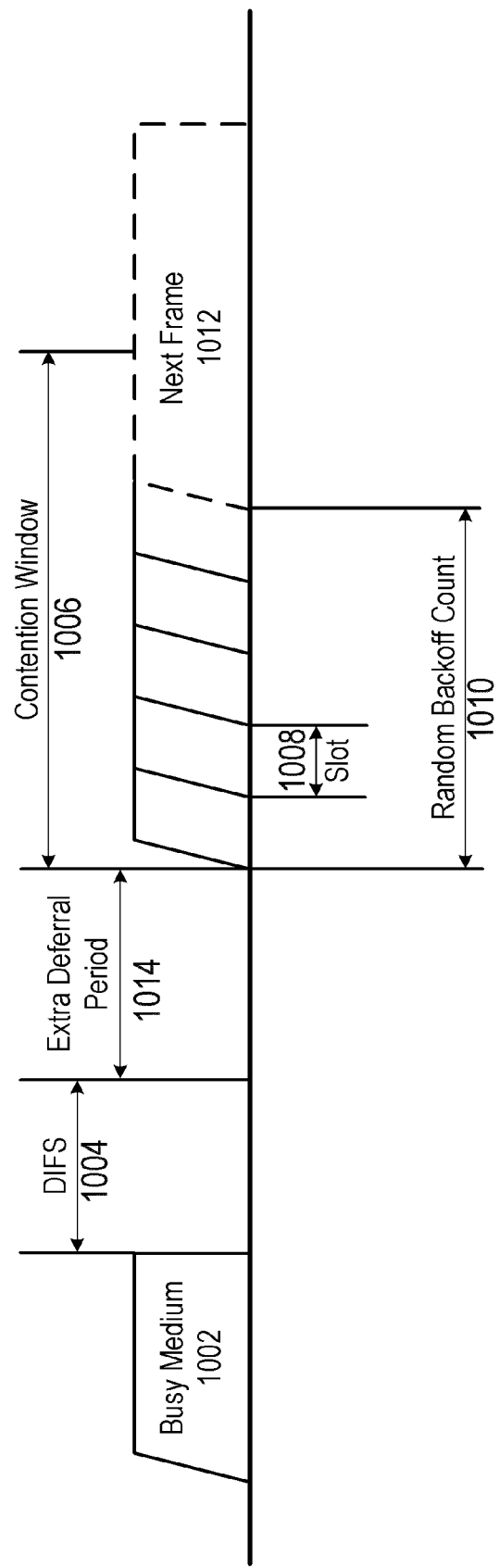
FIG. 10 is a diagram showing additional time intervals that may be used in a CSMA scheme that may be employed by a wireless device of FIG. 2, in accordance with an embodiment.

FIG. 10 is a diagram showing additional time intervals that may be used in a CSMA scheme that may be employed by a wireless device 202 of FIG. 2. In accordance with one embodiment, an additional time period referred to as an extra deferral period 1014 is provided. This extra deferral time period 1014 is in addition to the DIFS time interval 1004 and the random backoff count 1010 interval as described above with reference to FIG. 5. In accordance with the embodiment, a wireless device 202 defers for a given amount of time (shown by the extra deferral period 1014) before starting the count-down procedure using the selected random backoff count 1010. The extra deferral time period 1014 may be dynamic. For example, the duration of the extra deferral time period 1014 may be randomly determined, pseudo-randomly determined (e.g., based on a function whose results are time varying), or fixed and assigned based on some operating characteristic. The number of time slots defining the extra deferral time period 1014 may be determined based on a number of parameters such as the size of the contention window 1006, the effective number of active wireless devices operating within the network, traffic patterns, the MAC Address, and the like. For example, where each wireless device 202 has a different extra deferral time period 1014, each wireless device 202 may begin its random backoff count 1010 at a different time. Because each device may begin its countdown at a different time, CWmin for each device may be set to a smaller value without increasing the chance of a collision.

Figure 11:
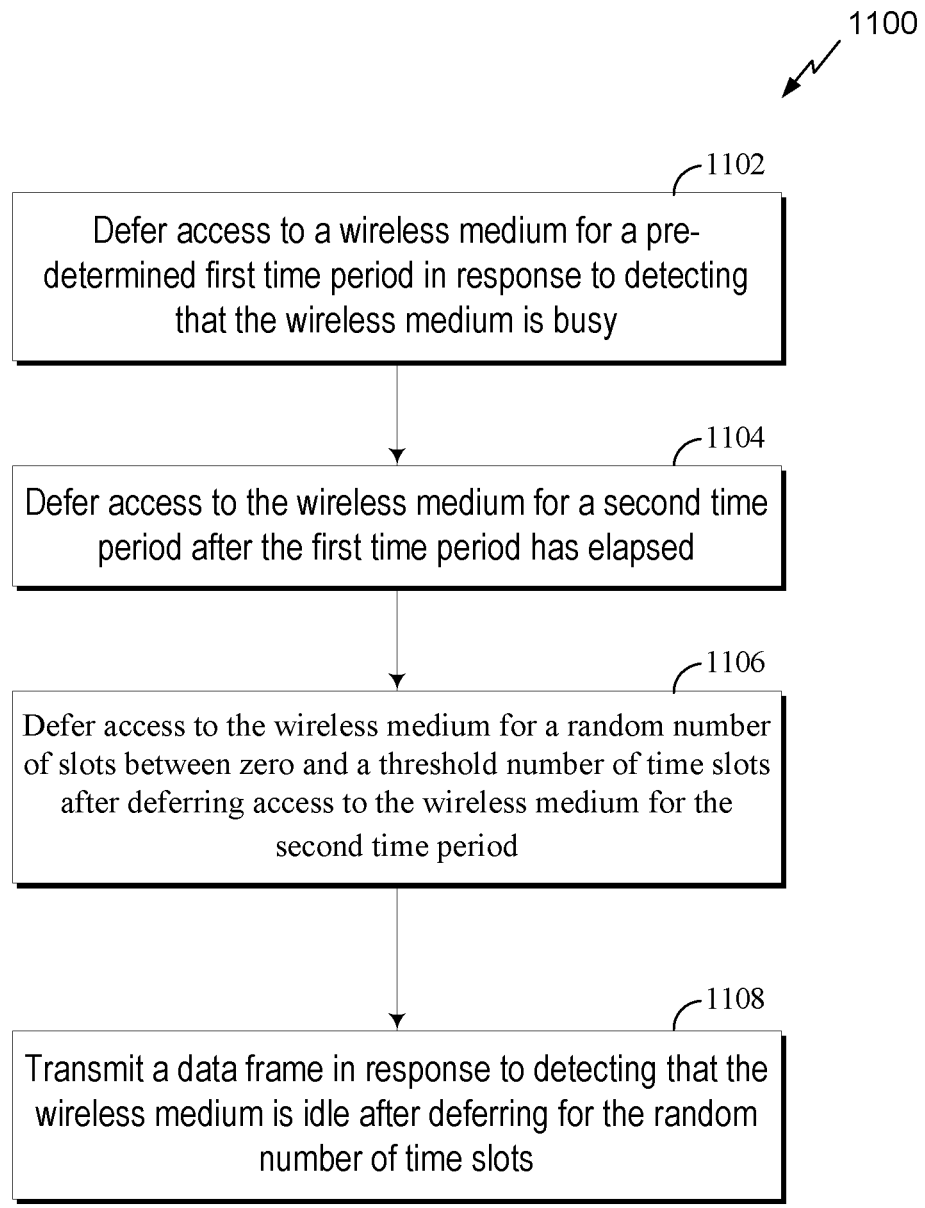
FIG. 11 is a flowchart of a method for deferring access to a wireless medium to avoid collisions, in accordance with an embodiment.

FIG. 11 is a flowchart of a method 1100 for deferring access to a wireless medium to avoid collisions, in accordance with an embodiment. At block 1102, access to a wireless medium is deferred for a pre-determined first time period in response to detecting that the wireless medium is busy. At block 1104, access to the wireless medium is deferred for a second time period after the first time period has elapsed. The deferral may be regardless of the status of the wireless medium (e.g., either idle or busy). The second time period may be adaptive and determined as described above (e.g., randomly, pseudo-randomly, or assigned). At block 1106, access to the wireless medium is deferred for a random number of slots between zero and a threshold number of time slots after deferring access to the wireless medium for the second time period. At block 1108, a data frame is transmitted in response to detecting that the wireless medium is idle after deferring for the random number of time slots.

Those skilled in the art will appreciate that a wireless device 202 may have more components than the wireless communication devices shown in FIGS. 2-4. For example, a device 202 may comprise a receiving module for wirelessly receiving data. The receiving module may be configured to perform one or more of the functions discussed above with respect with the blocks illustrated in FIGS. 7, 8A & 8B, 9A & 9B, and 11. The receiving module may correspond to the receiver 212 of FIG. 2, and may include the amplifier 401 of FIG. 4. In some cases, a means for receiving may include the receiving module. The device 202 may further comprise a transmitting module. The transmitting module may be configured to perform one or more of the functions discussed above with respect to the blocks illustrated in FIGS. 7, 8A & 8B, 9A & 9B, and 11. In some cases a means for transmitting comprises the transmitting module. The transmitting module may include a variety of components including, but not limited to, a constellation mapper, a modulator, an IDFT (inverse discrete time fourier transform module or IFFT 304 as described above with reference to FIG. 3), a digital to analog converter, an amplifier, an antenna, and other components. The wireless device 202 may further include a determining module. The determining module may be configured to perform one or more of the functions discussed above with respect to the blocks illustrated in FIGS. 7, 8A & 8B, 9A & 9B, and 11. The determining module may be configured as one or more of a processor, such as processor 204 of FIG. 2, or a controller. In some cases a means for determining comprises the determining module.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of communicating via a wireless medium by a wireless communications apparatus within a network, comprising:
    utilizing, by the wireless communications apparatus, a contention window for wireless communication, the contention window comprising one or more time slots provided for determining a deferral period for deferring access to the wireless medium;
    estimating, by the wireless communications apparatus, a collision probability associated with a load of the network, the collision probability estimated based at least in part upon a number of the one or more time slots that are idle;
    adjusting, by the wireless communications apparatus, a size of the contention window, in response to a successful transmission of a frame, based at least on the estimated collision probability the adjustment comprising increasing the size of the contention window if the number of the one or more time slots is below a lower threshold and decreasing the size of the contention window if the number of the one or more time slots is above an upper threshold; and
    transmitting, by the wireless communications apparatus, information indicating the size of the contention window to one or more wireless devices operating within the network.

2. The method of claim 1, further comprising at least one of:
    setting the size of the contention window to a minimum size;
    reducing the size of the contention window according to a linear function;
    reducing the size of the contention window according to an exponential function;
    reducing the size of the contention window by subtracting a first value; and
    scaling the size of the contention window by multiplying by a second value.

3. The method of claim 2, further comprising:
    adjusting the minimum size to a value proportional to a number of wireless devices operating within the network, and
    transmitting an indication of the adjusted minimum size to the one or more wireless devices.

4. The method of claim 1, further comprising:
    determining whether a number of active wireless devices operating in the network is above a threshold;
    determining whether the estimated collision probability is above an upper collision threshold;
    determining whether the estimated collision probability is below a lower collision threshold; and
    determining whether a number of detected un-decodable busy slots of the one or more time slots is above a busy slot threshold.

5. The method of claim 1, further comprising:
    determining whether the estimated collision probability is above a threshold; and
    reducing the size of the contention window to a minimum size if the estimated collision probability is above the threshold.

6. The method of claim 1, wherein transmitting the information indicating the size of the contention window comprises transmitting the information in at least one of a beacon message, a unicast message sent to a particular device, and a probe response.

7. The method of claim 1, further comprising:
    determining a maximum size of the contention window that is proportional to a number of active wireless devices operating within the network; and
    transmitting the maximum size to the one or more wireless devices.

8. The method of claim 1, further comprising receiving information from the one or more wireless devices, wherein estimating the collision probability comprises estimating the collision probability based at least in part on the received information.

9. A wireless communications apparatus for communicating via a wireless medium within a network, the apparatus comprising:
    a processor configured to:
        utilize a contention window for wireless communication, the contention window comprising one or more time slots provided for determining a deferral period for deferring access to the wireless medium;

estimate a collision probability associated with a load of the network, the collision probability estimated based at least in part upon a number of the one or more time slots that are idle; and adjust a size of the contention window, in response to a successful transmission of a frame, based at least on the estimated collision probability, the adjustment comprising increasing the size of the contention window if the number of the one or more time slots is below a lower threshold and decreasing the size of the contention window if the number of the one or more time slots is above an upper threshold; and a transmitter configured to transmit information indicating the size of the contention window to one or more wireless devices operating within the network.

10. The apparatus of claim 9, wherein the processor is further configured to perform at least one of:

setting the size of the contention window to a minimum size;

reducing the size of the contention window according to a linear function;

reducing the size of the contention window according to an exponential function;

reducing the size of the contention window by subtracting a first value; and scaling the size of the contention window by multiplying by a second value.

11. The apparatus of claim 10, wherein the processor is further configured to adjust the minimum size to a value proportional to a number of wireless devices operating within the network, and wherein the transmitter is further configured to transmit an indication of the adjusted minimum size to the one or more wireless devices.

12. The apparatus of claim 9, wherein the processor is further configured to:

determine whether a number of wireless devices operating in the network is above a threshold;

determine whether the estimated collision probability is above an upper collision threshold;

determine whether estimated collision probability is below a lower collision threshold; and determine whether a number of detected un-decodable busy slots of the one or more time slots are above a busy slot threshold.

13. The apparatus of claim 9, wherein the processor is further configured to determine whether the estimated collision probability is above a threshold, and reduce the size of the contention window to a minimum size if the estimated collision probability is above the threshold.

14. The apparatus of claim 9, wherein the processor is further configured to determine a maximum size of the contention window that is proportional to a number of wireless devices operating within the network, and wherein the transmitter is further configured to transmit the maximum size to the one or more wireless devices.

15. The apparatus of claim 9, further comprising a receiver configured to receive information from the one or more wireless devices, wherein the processor is further configured to estimate the collision probability based at least in part on the received information.

16. A method of communicating via a wireless medium by a wireless communications apparatus within a network, comprising:

utilizing, by the wireless communications apparatus, a contention window for wireless communication, the contention window comprising one or more time slots provided for determining a deferral period for deferring access to the wireless medium;

estimating, by the wireless communications apparatus, a collision probability associated with a load of the network, the collision probability estimated based at least in part upon a number of the one or more time slots that are idle;

a frame, based at least on the estimated collision probability, the adjustment made independently from a size of a contention window on other wireless devices on the network, the adjustment comprising increasing the size of the contention window if the number of the one or more time slots is below a lower threshold and decreasing the size of the contention window if the number of the one or more time slots is above an upper threshold; and determining, by the wireless communications apparatus, the deferral period based on the adjusted size of the contention window.

17. The method of claim 16, further comprising at least one of:

setting the size of the contention window to a minimum size;

reducing the size of the contention window according to a linear function;

reducing the size of the contention window according to an exponential function;

reducing the size of the contention window by subtracting a first value; and scaling the size of the contention window by multiplying by a second value.

18. The method of claim 16, further comprising receiving information from the one or more wireless devices, wherein estimating the collision probability comprises estimating the collision probability based at least in part on the received information.

19. The method of claim 16, further comprising:

determining whether the estimated collision probability is above a threshold; and reducing the size of the contention window to a minimum size if the estimated collision probability is above the threshold reducing the size of the contention window to a minimum size if the estimated collision probability is above the threshold.

20. A wireless communications apparatus for communicating via a wireless medium within a network, the apparatus comprising:

a processor configured to:

utilize a contention window for wireless communication, the contention window comprising one or more time slots provided for determining a deferral period for deferring access to the wireless medium;

estimate a collision probability associated with a load of the network, the collision probability estimated based at least in part upon a number of the one or more time slots that are idle;

adjust a size of the contention window, in response to a successful transmission of a frame, based at least on the estimated collision probability, the adjustment made independently from a size of a contention window on other wireless devices on the network, the adjustment comprising increasing the size of the contention window if the number of the one or more time slots is below a lower threshold and decreasing the size of the contention window if the number of the one or more time slots is above an upper threshold; and determine the deferral period based on the adjusted size of the contention window; and a memory configured to store the deferral period.

21. The apparatus of claim 20, wherein the processor is further configured to perform at least one of:

setting the size of the contention window to a minimum size;

reducing the size of the contention window according to a linear function;

reducing the size of the contention window according to an exponential function;

reducing the size of the contention window by subtracting a first value; and scaling the size of the contention window by multiplying by a second value.

22. The apparatus of claim 20, further comprising a receiver configured to receive information from the one or more wireless devices, wherein estimating the collision probability comprises estimating the collision probability based at least in part on the received information.

23. The apparatus of claim 20, wherein the processor is further configured to determine whether the estimated collision probability is above a threshold, and reduce the size of the contention window to a minimum size if the estimated collision probability is above the threshold.

* * * * *

UNITED STATES PATENT AND TRADEMARK OFFICE
CERTIFICATE OF CORRECTION

PATENT NO.         : 9,301,319 B2
APPLICATION NO.    : 14/152861
DATED              : March 29, 2016
INVENTOR(S)        : Gwendolyn Denise Barriac et al.

Page 1 of 1

It is certified that error appears in the above-identified patent and that said Letters Patent is hereby corrected as shown below:

In the specification,

In column 16 at line 2, Replace "M*N/NA2=MN." with --M*N/N^2=M/N.--.

In column 16 at line 13, Replace "1-e^-(MA2/2N)" with --1-e^-(M^2/2N)--.

In the claims,

In column 22, at line 9, in Claim 16, before "a frame, based at least on" insert --adjusting, by the wireless communications apparatus, a size of the contention window, in response to a successful transmission of--.

In column 22 at lines 42-44, in Claim 19, below "above a threshold; and" delete "reducing the size of the contention window to a minimum size if the estimated collision probability is above the threshold".

Signed and Sealed this
Twenty-third Day of August, 2016

Michelle K. Lee
*Director of the United States Patent and Trademark Office*